United States Patent [19]
Ishibai et al.

[11] Patent Number: 4,488,037
[45] Date of Patent: Dec. 11, 1984

[54] AUTOMATIC FOCUSING BINOCULAR

[75] Inventors: Isao Ishibai; Kunimitsu Kobayashi, both of Tokyo, Japan

[73] Assignee: Hoya Corporation, Tokyo, Japan

[21] Appl. No.: 354,672

[22] Filed: Mar. 4, 1982

[30] Foreign Application Priority Data

May 29, 1981 [JP] Japan .................. 56-80753

[51] Int. Cl.³ .............................. G01J 1/36
[52] U.S. Cl. ...................... 250/204; 250/227; 250/201
[58] Field of Search ............ 356/1, 4; 354/53, 60 L, 354/25 R, 25 A, 25 P, 25 N, 165, 166; 250/201, 204, 227; 350/174, 552, 410, 255, 553

[56] References Cited

U.S. PATENT DOCUMENTS

| | | | |
|---|---|---|---|
| 3,744,872 | 7/1973 | Akin, Jr. et al. | 350/552 |
| 4,012,123 | 3/1977 | Fuller | 350/174 |
| 4,085,320 | 4/1978 | Wilwerding | 250/204 |
| 4,274,149 | 6/1981 | Flanagan | 350/174 |
| 4,279,481 | 7/1981 | Ishibashi et al. | 354/53 |
| 4,293,187 | 10/1981 | Ishibai et al. | 250/201 |
| 4,293,205 | 10/1981 | Tokutomi et al. | 250/204 |
| 4,357,085 | 11/1982 | Niwa et al. | 354/25 A |
| 4,367,934 | 1/1983 | Matsui | 354/165 |

Primary Examiner—David C. Nelms
Assistant Examiner—Jere J. Brophy
Attorney, Agent, or Firm—Sughrue, Mion, Zinn, Macpeak and Seas

[57] ABSTRACT

An automatic focusing binocular is herein disclosed in which a light, signifying the inability of the automatic focusing system to operate due to the lack of available light contrast, is provided within the user's field of vision as he looks through the binocular. This is accomplished by the use of a focus detection module. When the reflected images from apertures proximate to the objective lens coincide in the module, a focusing signal is produced which terminates the motion of the eyepieces at a point corresponding to the distance of the object from the objective lens. When these coinciding images do not have sufficient light contrast for the module to produce the focus signal, a detection signal is produced which illuminates a warning light. A rod-shaped prism is disposed such that light from the light source condenses at the forward focal point of the eyepiece. In the case where the eyepiece assembly is moved in its entirety, as opposed to the movement of only one of its eyepiece lenses, a diopter adjusting ring is provided and appropriate apertures cut, such that the adjusting ring may be turned while maintaining the prism position at the focal point of the eyepiece assembly.

11 Claims, 4 Drawing Figures

AUTOMATIC FOCUSING BINOCULAR

BACKGROUND OF THE INVENTION

This invention relates to binoculars with automatic focusing mechanisms, and more particularly, to an automatic focusing binocular which displays within the field of vision of the user a light which signals the temporary incapacity of the automatic focusing feature of the binocular.

In a binocular in which light beams from a stationary reflector and a movable reflector are introduced to a focus detection module, in response to an instruction signal from this module, at least one part of an eyepiece in each eyepiece assembly is moved to automatically focus the binocular on an object. This automatic focusing feature is rendered inoperative when the automatic focusing system becomes out of order, or its components become defective. The automatic focusing mechanism also does not function when the binocular is used under conditions which exceed the capacity of the module. This capacity is exceeded when the contrast of light and shadow is extremely low; it is entirely dark within the field of vision; or the image, being intricate, is made up a number of contrasts of light and shadow. When the automatic focusing feature is inoperative in binoculars of the prior art, it is normally impossible to tell whether this inoperative condition is due to a defective system or due to an operational system being used in conditions which exceed its capacity.

SUMMARY OF THE INVENTION

In view of the foregoing, this invention eliminates the drawback accompanying a conventional automatic focusing binocular by providing a warning structure which displays within the field of vision the fact that the focusing system capacity has been exceeded. In the present invention, the warning structure comprises a focus detection module and a warning lamp which is turned on by a signal produced by the module when its capacity has been exceeded. Light emitted by this warning lamp is introduced into the field of vision of the binocular by a rod-shaped prism which is fixed substantially at the focal point of the eyepiece assembly, and within a movable barrel. In the case where the eyepiece assembly is moved in its entirety by the signal from the focus detection module, it is necessary to assemble a diopter adjusting ring in the binocular so that the ring is turnable. In this connection, a guide pipe, into which the rod-shaped prism adapted to introduce light from the warning lamp is inserted, is in turn inserted into an elongaged hole which is cut in the lens barrel. Therefore, even when the diopter adjusting ring is turned for diopter adjustment, the prism is maintained at the focal point of the eyepiece assembly, and the user can readily see the light from the warning lamp at all times.

DESCRIPTION OF THE PREFERRED EMBODIMENTS

Figure 1:
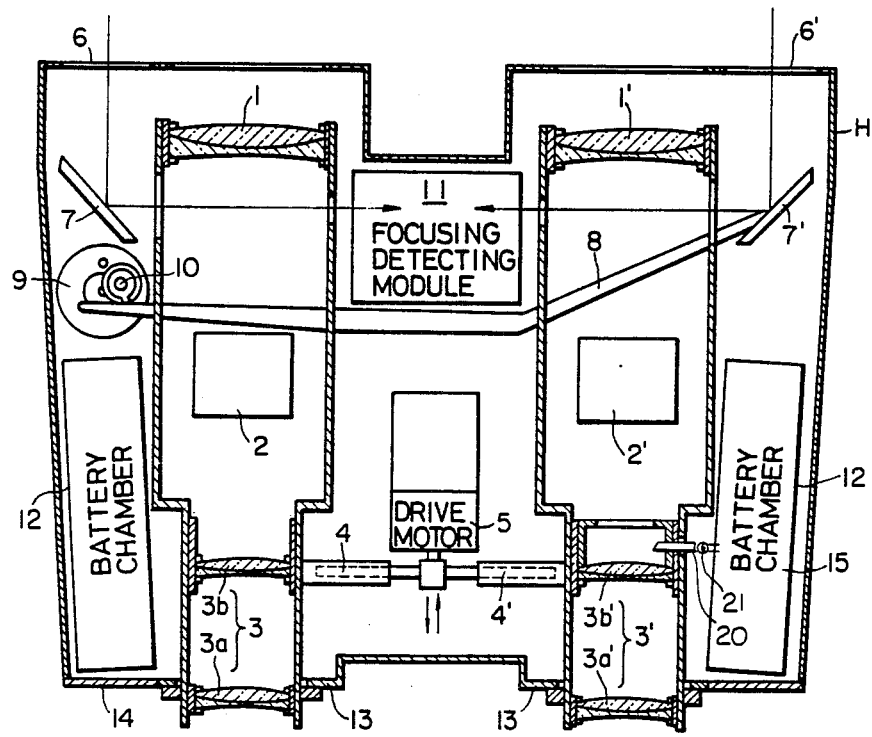
FIG. 1 is a cross-sectional view of one embodiment of an automatic focusing binocular according to the present invention.

A first embodiment of this invention will now be described with reference to FIG. 1. In FIG. 1, reference numerals 1 and 1' designate the objective lenses of the binocular, 2 and 2' are the prism groups arranged behind the objective lenses 1 and 1' and 3 and 3' are the eyepiece sections, which comprise stationary eyepieces 3a and 3a' secured to the housing H of the binocular, and mobile eyepieces 3b and 3b' which are axially mobile with respect to the housing H. The movable eyepieces 3b and 3b' are coupled through drive pins 4 and 4', and suitable gear means, to the output shaft of an eyepiece driving motor 5. The rotation of motor 5 thereby causes the movement of the movable eyepieces 3b and 3b', which in turn alters the focus positions of the eyepiece sections 3 and 3'.

Focusing apertures 6 and 6' for distance measurement are cut into housing H of the binocular at points proximate to the objective lenses 1 and 1', respectively. Reflectors 7 and 7' are positioned directly behind the focusing apertures 6 and 6', respectively. Reflector 7 is stationary, and reflector 7' is movable. A drive lever 8 is coupled on one end to the axis of the movable reflector 7', and on the other end to the movable reflector driving motor 9. An eccentric cam 10 is fixedly secured to the output shaft of the motor 9, and is brought into contact with the end of the drive lever 8.

A focus detection module 1 is disposed between the stationary reflector 7 and the movable reflector 7', i.e., between the right and left optical systems, and receives the light beams reflected by these reflectors. The focus detection module 11 is equivalent to those which are used for focus detection in an automatic focusing camera and are well known in the art. The module 11 deflects the movable reflector (7') by driving both the movable reflector driving motor 9 and the eyepiece driving motor 5 which operates in association with the motor 9. This deflection operation continues until such time as the light beams from the reflectors 7 and 7' coincide with each other in the module. When this coincident image is formed, the module 11 generates a signal to stop the driving motors 9 and 5. Also, in FIG. 1., reference numeral 12 designates chambers for receiving batteries 15, 13 designates the end plates of the eyepiece sections, and 14 designates the covers for the chambers 12.

Figure 2:
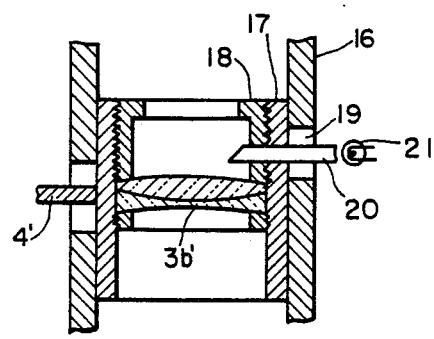
FIG. 2 is an enlarged sectional view showing a movable lens and its relevant components.

Referring now to FIG. 2, a movable barrel 17, which is inserted into a lens barrel 16, is moved in the direction of the optical axis of the lens barrel 16 by driving motor 5 and its associated drive pin (4 or 4'). Holes are cut into both the movable barrel 17 and a field-of-vision ring 18 which has been fitted in the movable barrel 17 and is adapted to fixing the lens. A rod-shaped prism 20 is secured through the holes thus cut. The rod-shaped prism 20 is then inserted into an elongated hole which is cut in lens barrel 16 along its optical axis. One end of the prism 20 extends to the focal point of the eyepiece section, while the other end extends to a warming lamp 21 which is disposed beside the lens barrel. The prism has an inclined surface at the end which extends into the eyepiece section so that the light introduced by the warning light is reflected thereby into the field of vision of the eyepiece section.

Figure 3:
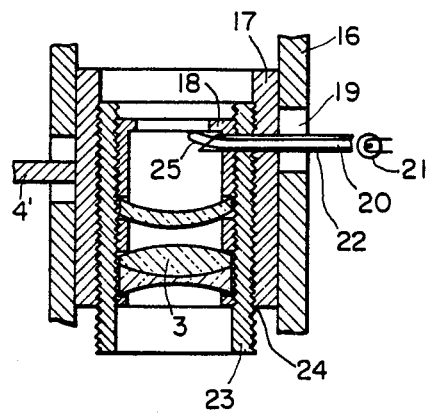
FIG. 3 is an enlarged sectional view showing another embodiment of the binocular according to the present invention, in which an eyepiece group is made movable in its entirety.
Figure 4:
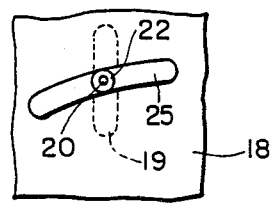
FIG. 4 is a partial unfolding diagram showing a part of the inner wall of a diopter adjusting ring.

FIG. 3 illustrates another embodiment of the binocular according to the present invention, in which the eyepiece group 3' is movable in its entirety. In this example, a diopter adjusting ring 23, threaded as indicated 24, is inserted between a movable barrel 17 and a field-of-vision ring 18. A rod-shaped prism 20, protected by a guide pipe 22, is secured at its middle portion to the movable barrel 17. The rod-shaped prism 20 is extended through the diopter adjusting ring 23 and the field-of-vision ring 18 in such a manner that one end is disposed at the focal point of the eyepiece section and the other end is disposed beside a warning lamp 21. As shown in FIG. 4, in addition to an elongated aperture 19 cut into the lens barrel 16, a curved aperture 25 is cut into the field-of-vision ring 18 and the diopter adjusting ring 23. This aperture 25 coincides with the lead angle of the threaded portion 24, and has a length within the stroke of the diopter adjusting ring 23. When the diopter adjustment operation is initiated by rotating the diopter adjusting ring 23, since the rod-shaped prism 20 is guided by the sloped hole 25, the prism 20 can introduce the light from the warning lamp 21 into the field of vision of the eyepiece section irrespective of the movement of the diopter adjusting ring.

The operation of the focus detection module 11 will now be described in greater detail. Light beams entering the objective lenses 1 and 1' pass through the prism groups 2 and 2' and form images on the user's eyes with the aid of the eyepiece sections 3 and 3', respectively. Light focusing apertures 6 and 6' are provided, such that light beams entering by the apertures 6 and 6' are introduced into the housing H by the stationary and movable reflectors 7 and 7', respectively. As the movable reflector 7' is turned in a reciprocating manner by the drive lever 8, the image from the movable reflector 7', as reflected onto the focus detection module 11, is reciprocated or vibrated in such a manner that it overlaps the image from the stationary reflector 7. At the moment when the movable reflector 7' turns through an angle corresponding to the distance to the object, the two images coincide with each other, and the focus detection module 11 produces a focusing signal. In response to this signal, the eyepiece 3b and 3b' are moved to positions which correspond to the distance to the object; i.e., the angle of the movable reflector 7' which is obtained at the moment when the two images coincide with each other in the focus detection module. The positions of the eyepieces are thereby set such that their front focal points coincide with the positions of the images which are formed by the objective lenses, automatically focusing the viewed images.

The focus detection module 11 essentially comprises photo-electric converters, integration circuits and a comparator. When the integrations of contrast peaks obtained from the images through the reflectors 7 and 7' coincide with each other, the module 11 produces an output signal of focalization; when the contrast peaks are lower than a preselected reference point, the module 11 cannot produce the signal suitably. That is, when the contrast between light and shade is extremely low, or an image, being intricate, is made up of a number of contrasts of light and shade, the contrast peaks are not sufficiently high, and the automatic focusing mechanism does not produce a focusing signal. In this case, the focus detection module provides a signal at its abnormal condition detection terminal, thereby illuminating warning lamp 21. Light from the warning lamp 21 is introduced inside the field-of-vision ring 18 through the rod-shaped prism 20. The light is reflected by the inclined surface at the end of the rod-shaped prism 20, so that it is introduced into the field of vision through the eyepiece section 3.

The rod-shaped prism 20 is fixedly secured to the movable barrel 17 and is freely movable in the elongated hole 19 which is parallel with the axis of the lens barrel 16. By this arrangement, the prism 20 can cooperate with the eyepiece section 3 in the movable barrel. Thus, even if the eyepiece section 3 is moved by the automatic focusing mechanism, the end of the prism 20 is maintained at the front focal point of the eyepiece, enabling the user to clearly see the warning signal. In the case where a diopter adjusting ring 23 is provided as shown in FIG. 3, the rodshaped prism 20, as covered by the guide pipe 22, is fixedly secured to the movable barrel 17 and placed in the curved aperture 25 formed in the diopter adjusting ring 23. This enables the prism 20 to be freely movable along the elongated hole 19 in parallel with the axis of the lens barrel 16. Therefore, even when the diopter adjusting ring 23 is turned, no warming signal is produced within the field of vision, and the user can see the warning signal at its predetermined position.

As is apparent from the above-detailed description, with an automatic focusing binocular according to the present invention, a signal is provided at a predetermined position in the field of vision of the binocular, which notifies the user that the automatic focusing apparatus has been rendered inoperative due to the lack of light or contrast in light. Therefore, the case where the automatic focusing mechanism is not in operation due to the lack of available light can be distinguished from the case where it is not in operation due to a malfunction.

What is claimed is:

1. An automatic focusing binocular, comprising:
   a housing;
   an input lens system including a plurality of focusing apertures;
   dual eyepiece sections, disposed behind said input lens system, each section comprising a stationary lens and a mobile lens of axial motion;
   a stationary reflector, disposed directly behind one of said dual focusing apertures;
   a mobile reflector, which rotates on its vertical axis, disposed directly behind the other of said dual focusing apertures;
   a focus detection module, disposed between said stationary reflector and said mobile reflector and receiving images reflected by both said stationary reflector and said mobile reflector, said images being processed and compared to each other and to a reference value of light contrast; and
   a warning means including an illumination source actuated upon a detection signal as produced by said focus detection module to indicate that automatic focusing is impossible for prevailing light conditions.

2. The automatic focusing binocular of claim 1, further comprising a prism for the introduction of light from said illumination source into the field of vision of the binoculars, one end of which is disposed proximate to said illumination source and the other end of which is disposed proximate to the focal point of said dual mobile eyepiece sections.

3. The automatic focusing binocular of claim 2, wherein said prism is of elongated, rod-like shape, and has an inclined surface at said end disposed proximate to said focal point of each of said dual eyepiece sections.

4. The automatic focusing binocular of claim 1, further comprising:
   a first drive means for the deflection of said mobile reflector, the operation of which is controlled and terminated by a focusing signal as produced by said focus detection module; and
   a second drive means for the deflection of said mobile lenses along said axial direction of both of said dual eyepiece sections, the operation of which is controlled and terminated by said focusing signal as produced by said focus detection module.

5. The automatic focusing binocular of claim 4, wherein said focus detection module produces a drive signal which drives both said first drive means and said second drive means.

6. The automatic focusing binocular of claim 4, wherein said first drive means repeatedly deflects said mobile reflector.

7. The automatic focusing binocular of claim 4, wherein said second drive means deflects each of said mobile lens of each of said twin eyepiece sections a distance corresponding to the angle of deflection of said mobile reflector.

8. The automatic focusing binocular of claim 4, wherein said second drive means terminates the deflection of each of said mobile lens of each of said dual eyepiece sections at a point whereby the front focal point of each of said mobile lens coincides with the positions of the images formed by dual objective lenses of said input lens system.

9. The automatic focusing binocular of claim 2, wherein light from said illumination source condenses upon said end of said prism disposed proximate to said illumination source, travels along said prism, and is introduced into at least one of said eyepiece sections at said end of said prism proximate to said focal point of eyepiece section, thereby being within the field of vision of the user, at a predetermined point determined by the location of said end of said prism disposed proximate to said focal point of said eyepiece section.

10. The automatic focusing binocular of claim 1, wherein said dual mobile eyepiece sections comprise:
    an outside lens barrel;
    a diopter adjusting ring inside said outside barrel; and
    a field-of-vision ring inside said diopter adjusting ring to which is attached a plurality of eyepiece lenses.

11. The automatic focusing binocular of claim 10, wherein said outside lens barrel possesses an elongated aperture perpendicular to its axis; and both of said diopter adjusting ring and said field-of-vision ring possesses a curved aperture; thereby enabling said prism to maintain its position relative to said eyepiece lenses during a diopter adjusting operation.

* * * * *